W. J. RICHARDS.
AUTOMATICALLY ADJUSTABLE BRUSH HOLDER.
APPLICATION FILED SEPT. 10, 1900.
900,884.
Patented Oct. 13, 1908.
2 SHEETS—SHEET 1.
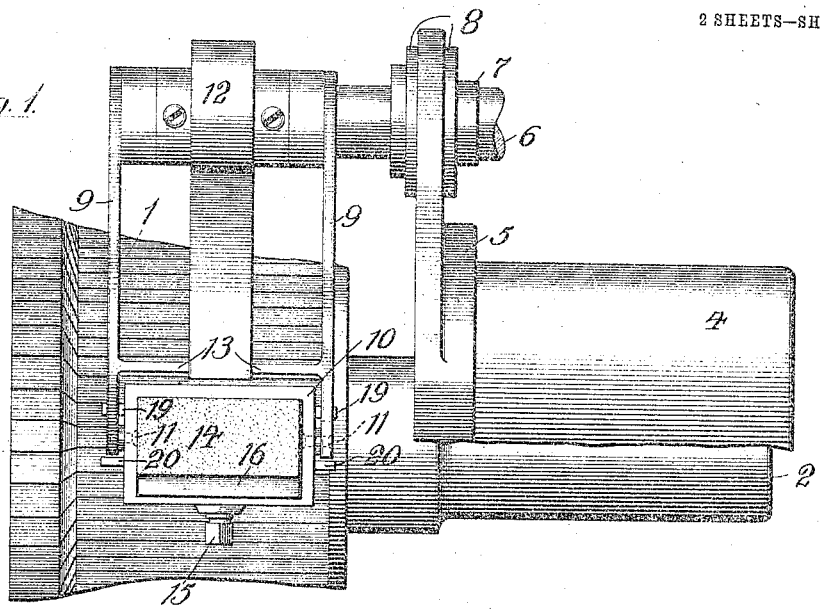
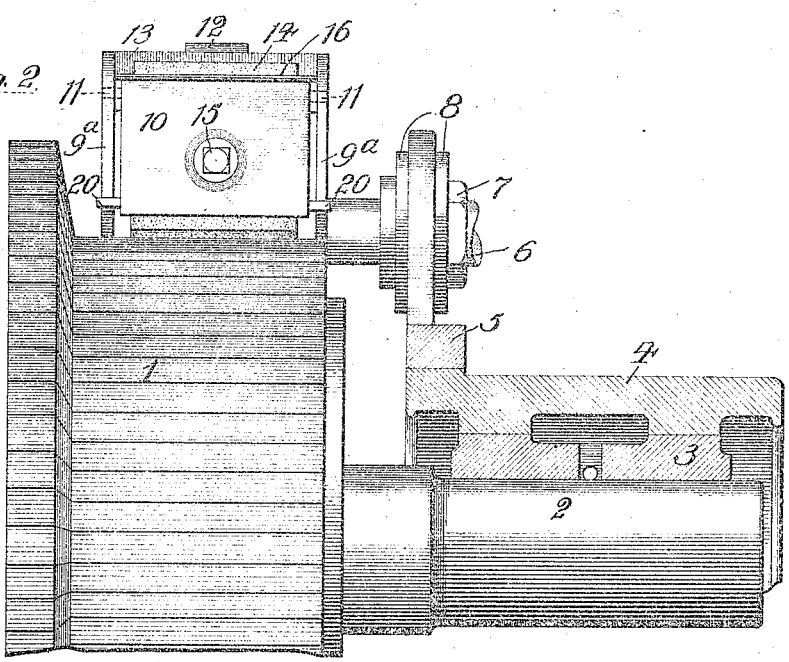
Witnesses:
Inventor.
Walter J. Richards.
By Coburn, Hibben & McElroy
Attys.

W. J. RICHARDS.
AUTOMATICALLY ADJUSTABLE BRUSH HOLDER.
APPLICATION FILED SEPT. 10, 1900.
900,884.
Patented Oct. 13, 1908.
2 SHEETS—SHEET 2.
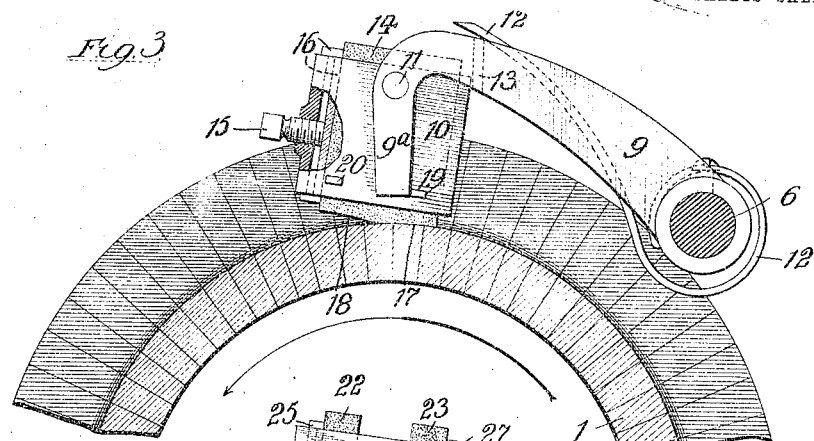
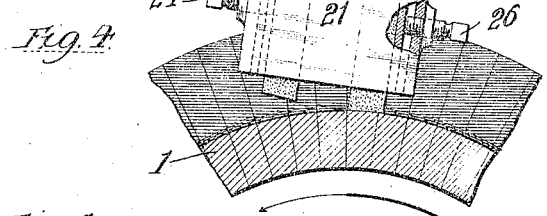
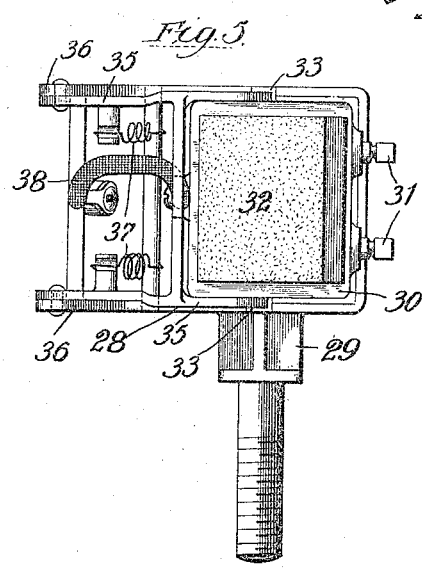
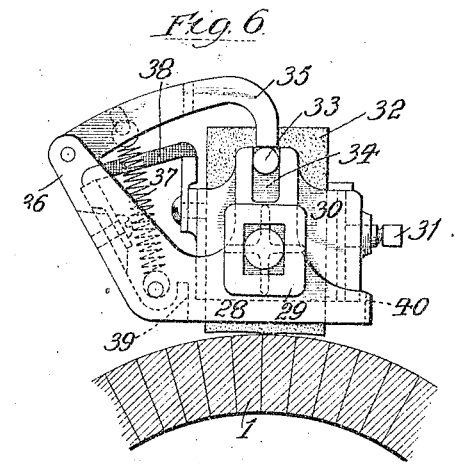
Witnesses:
Luth S. Alter
George R. Harlaugh
Inventor:
Walter J. Richards
By Coburn, Hibben & McElroy
Attys

UNITED STATES PATENT OFFICE.

WALTER J. RICHARDS, OF MILWAUKEE, WISCONSIN, ASSIGNOR TO ALLIS-CHALMERS COMPANY, A CORPORATION OF NEW JERSEY.

AUTOMATICALLY-ADJUSTABLE BRUSH-HOLDER.

No. 900,884.

Specification of Letters Patent.

Patented Oct. 13, 1908.

Application filed September 10, 1900. Serial No. 29,571.

*To all whom it may concern:*

Be it known that I, WALTER J. RICHARDS, a resident of Milwaukee, in the county of Milwaukee and State of Wisconsin, have invented a certain new and useful Automatically-Adjustable Brush-Holder, of which the following is a specification.

My invention relates to what are commonly known in the electric art as brush holders and the object thereof is to provide a brush holder which shall be automatic in action and to devise a simple and efficient construction attaining that result.

It is well known that, in a motor, the best plane of commutation is slightly back of the neutral plane where, in those armature coils short circuited by the commutator brushes, an electromotive force would be generated that not only will overcome the self induction of the current to be reversed, but also will establish in the said short circuited coils a flow of current in the same direction as the reversed current. As is also well known in the art, similar actions take place in dynamos but the best plane of commutation is forward of the neutral plane.

In a properly designed motor running under no load, the neutral plane may be defined as the plane extending lengthwise of the armature midway between the poles, and may be said to be the plane of no magnetism. It is also a fact that the current passing through the armature windings has a distorting effect on this neutral plane, in the case of a motor the neutral plane shifting backward opposite to the direction of rotation of the armature. In electrical motors running continuously in one direction, the brushes are permanently set as favorably as possible for the particular conditions under which the machines are running. In reversible motors, such as motors operating cranes, elevators, etc., the brushes cannot be so set permanently in the best possible position, inasmuch as the neutral plane shifts in the one direction or the other according to the direction of rotation of the armature.

The object of my invention is to provide a brush capable of automatically adjusting itself to the proper or most favorable position in whichever direction the motor may be run, that is a brush capable of following up the shifting of the neutral plane, thereby maintaining the non-sparking position of commutation.

In the drawings, Figure 1 is a plan view of a portion of an electric motor with my brush applied; Fig. 2 a side elevation thereof; Fig. 3 an end view thereof; and Figs. 4, 5 and 6 views of modified forms of construction.

The usual commutator 1 has a shaft 2, shaft bearing 3 and bearing box 4. A brush holder yoke or support 5 is secured to the box and carries at its outer end a rod or stud 6 fastened to such yoke by the nut 7 and insulated from the yoke by insulating bushings 8. In this manner the rod is held rigidly to the yoke but insulated therefrom.

A frame having the two arms 9 is pivoted at one end upon the stud and between the outer end of these arms is carried a brush holder 10. This holder which is preferably rectangular and open at top and bottom, is pivoted to the arms 9 by the rivets 11 or otherwise so as to be free to turn. The extreme ends 9$^a$ of the arms preferably, though not necessarily, bend substantially at right angles and downward when beyond their pivotal point as is clearly shown in Fig. 3. Obviously equivalent constructions may be adopted. Suitable tension is applied upon the frame to hold the same towards the commutator and as shown I employ a coiled leaf spring 12 fastened at one end to the rod 6 and bearing upon a cross piece or bridge 13 between the arms 9.

The brush, or more accurately speaking the carbon, consists of a piece or block of carbon 14 held within the carbon holder by the set screw 15 which bears against the intermediate clamping plate 16. This brush is presented substantially "end on" to the commutator. The contacting end of the carbon brush has, on either side of its central axis, the cylindrical surfaces 17 and 18 whose radii are equal to the radius of the commutator, these surfaces of necessity assuming this shape or arc on account of the wearing of the carbon against the commutator.

The exterior of the brush holder on two opposite sides is provided with a pair of lugs or projections 19 and 20 which are respectively contacted by the arms 9$^a$, according to whichever face 17 or 18 is contacting the armature. The brush holder is so set that a central plane in the carbon extending parallel with the rod 6 and perpendicularly to the commutator rests upon that portion of the commutator which is directly connected to the armature conductors lying midway between the poles.

While I prefer to use and have herein shown the lugs 19 and 20 located on the carbon holder and coöperating with the arms 9ᵃ it will be understood that, so far as the broader claims are concerned, any means may be adopted for the purpose desired as for instance any fixed point may be used to form a stop by contact of such holder therewith.

The operation of my brush holder is as follows: When the armature is rotating anticlockwise, that is in the direction of the arrow in Fig. 3, and there being friction between the carbon and the commutator due to the tension of the spring, the carbon is rotated about the axis of its holder until the arms 9ᵃ contact the lugs 19. The result is that the portion 17 of the carbon seats on the commutator on the right hand of the shifted neutral plane, or approximately thereto, inasmuch as the amount of shifting is proportional to the load on the motor. Consequently when in the claims it is stated that the carbon seats behind the shifted neutral plane, it may be thus or approximate thereto. The carbon has thus been automatically adjusted to the proper and most favorable position on the commutator for non-sparking.

When the armature rotates clockwise, the carbon is rotated about the axis of its holder until the arms 9ᵃ are contacted by the lugs 20 at which time the portion 18 will have a seating against the commutator on the left hand side or approximate thereto (Fig. 3) of the above mentioned neutral plane which has shifted as above described.

To adapt it to the requirements of a reversing motor, the carbon is considerably wider than that permanently set on commutators running continuously in one direction, inasmuch as only one-half of the contacting end of my carbon is in service at any one time. It will be evident that the greater the desired shifting of the carbon the greater must be the width thereof.

While I prefer to use a single block of carbon with its two surfaces 17 and 18 it is evident that it may be split up into two separate pieces without departing from the spirit of my invention. In Fig. 4 I have illustrated such division and also the changed construction necessary. In this form, the carbon holder 21 is adapted to receive the two carbons 22 and 23, the former being held therein by set screw 24 and clamping plate 25 and the latter by set screw 26 and clamping plate 27. The carbon holder may be pivoted in substantially the same manner as shown in Figs. 1 to 3. Manifestly the carbons may be located in greater or less proximity to each other, provided, however, the distance separating the two carbons is kept within reasonable limits. The operation of the construction just described is substantially the same as that of the other already described.

Figs. 5 and 6 show a modified form of construction of the brush holder and its supporting frame but embodying the same principles and mode of operation as the other forms. The housing 28 preferably rectangular has a shank 29 for attachment to any suitable support. In a carbon holder 30 is secured by set screws 31 the carbon 32. This holder has on two opposite sides trunnions 33 fitting snugly but not tightly in slots 34 which are radial of the commutator, whereby the holder is loosely contained within the housing. A hammer 35 is pivoted to the arms 36 projecting upwardly from the housing and is downwardly curved at its free end so as to rest upon the trunnions. This hammer is downwardly pressed by the springs 37 and the pressure is ultimately transmitted to the carbon in a direction perpendicular to the commutator. A flexible conductor 38 connects the holder with the housing. The holder is adapted to turn on its trunnions until its lower end contacts the housing at 39 when the armature is rotating in one direction or at 40 when rotating in the opposite direction. The operation of this form is substantially the same as that of the other forms already described.

It will be understood that I do not confine my invention to the use of carbon inasmuch as any conducting material suitable for the purpose may be used, furthermore, the term "brush" is employed herein in a broad generic sense as meaning any conductor for taking the current from the commutator.

My brush or carbon thus has a changed position of contact on the commutator whenever the direction of rotation is changed. Inasmuch as, in a motor, the neutral plane shifts backward, my brush is constructed so as to obtain a seating on the commutator at a point behind this shifted neutral plane and to automatically adapt itself to the changes incident to the change in direction of rotation. To accomplish these results, the brush is so pivoted as that its contacting surfaces have, with respect to the commutator, a tangentiality in a direction opposite or against the direction of rotation of the commutator.

I claim:

1. The combination with a reversible motor and its commutator, of a pivoted brush holder, and a brush adjustably arranged in said holder and having two separate contacting surfaces, said holder and its brush being automatically adjustable according to the direction of rotation of the commutator to present one or the other surface on one or the other side of the shifted neutral plane, the body of the brush being arranged substantially radial of the commutator, and the two contacting surfaces having radial directions of feed toward the commutator with their central longitudinal axes, which pass through said contacting surfaces, parallel to each other.

2. A brush comprising, in combination with a reversible motor and its commutator, a pivoted frame, a carbon holder pivoted in such frame, a single carbon arranged in such holder and having different commutating surfaces which are adapted to be fed radially or "end on" to the commutator, said carbon being automatically adjustable according to the direction of rotation of the commutator to present one or the other of such surfaces on one or the other side of the shifted neutral plane but always behind such plane or approximate thereto.

3. A brush comprising, in combination with a commutator a carbon pressing on the commutator, a holder therefor, lugs or stops on the holder, and a frame intermediate of whose length the holder is pivoted, the frame extending between such lugs to limit the relative movements of the holder and frame.

4. A brush comprising in combination with a support, a stud or rod mounted thereon, a frame pivoted on such stud, a carbon holder pivoted to the frame, a carbon arranged in such holder, and having two contacting surfaces from the center outwards and on the same arc of a circle as the commutator, means for securing the carbon in the holder and means for limiting the pivotal movement of the holder in either direction with respect to the frame.

5. A brush comprising, in combination with a support, a stud or rod mounted thereon, a double armed frame pivoted at one end to the stud, a carbon holder pivotally mounted near the free ends of the arms of such frame and provided with pairs of exterior lugs on the sides on which it is pivoted, the extreme free ends of said arms being extended downwardly substantially at right angles below the point on which the holder is pivoted and between the pairs of lugs, and a carbon in the holder.

6. A brush comprising a pivoted frame 9, having angled ends $9^a$, a carbon holder 10 pivoted to the frame at 11 and having pairs of lugs 19 and 20, a carbon in the holder, a clamping plate in the holder, and a set screw passing through the holder and bearing against the plate, the ends $9^a$ of the frame being positioned between such lugs which, being contacted thereby, act as stops to limit the pivotal movement of the holder.

7. A brush comprising in combination with the bearing box 4 and the support 5 thereon, a stud or rod 6 in such support, insulating bushings 8 on either side of the support to insulate the stud therefrom, a frame pivoted on the stud and having parallel arms 9 whose extreme ends $9^a$ are extended substantially at right angles, a cross piece 13 between the arms, a carbon holder 10 pivotally mounted between the arms of such frame, a carbon in such holder and a coiled leaf spring whose coiled end is rigidly secured to the stud and whose other end bears upon said cross piece to depress the frame and the carbon holder and carbon.

8. In combination with a reversible motor and its commutator, a brush comprising a pivoted carbon holder and a single carbon adjustably retained therein having on its end adjacent to the commutator the two contacting surfaces 17 and 18 presentable to the commutator on either side of the shifted neutral plane of the commutator but therebehind or approximate thereto, such surfaces being always presented in a tangential direction opposite to the direction of rotation of the commutator and the body of the carbon being directed substantially radially of the commutator.

WALTER J. RICHARDS.

Witnesses:
GEORGE ELLESON,
R. L. GRUBER.